United States Patent [19]

DeWald et al.

[11] Patent Number: 4,497,467
[45] Date of Patent: Feb. 5, 1985

[54] PLUG VALVE WITH HYDRAULICALLY ACTUATED SEALS

[76] Inventors: Carl O. DeWald, 3920 Avenida Verano, Thousand Oaks, Calif. 91360; Jack H. Pollock, 1428 W. 132nd St., Gardena, Calif. 90249

[21] Appl. No.: 418,590

[22] Filed: Sep. 15, 1982

[51] Int. Cl.³ .............................................. F16K 31/44
[52] U.S. Cl. .................................... 251/78; 251/159; 251/161; 251/170; 251/175; 251/188; 137/556; 137/568
[58] Field of Search ............... 137/556, 568; 251/159, 251/172, 173, 188, 161, 175, 171, 170, 189, 78; 138/31

[56] References Cited

U.S. PATENT DOCUMENTS

| | | | |
|---|---|---|---|
| 2,299,341 | 10/1942 | Ohls | 251/161 |
| 2,600,898 | 6/1952 | Maxwell | 251/159 |
| 2,611,393 | 9/1952 | Gravenhorst | 138/31 |
| 2,746,712 | 5/1956 | Wickwau | 251/161 X |
| 3,037,524 | 6/1962 | Rast | 137/556 X |
| 3,213,615 | 10/1965 | Björnberg | 138/31 X |
| 3,464,669 | 9/1969 | Henrion | 251/173 |
| 3,475,004 | 10/1969 | Jennings | 251/175 |
| 3,711,062 | 1/1973 | Kirkwood | 251/172 |
| 3,901,474 | 8/1975 | Kubota | 251/159 |
| 4,130,129 | 12/1978 | Pollock | 251/188 X |
| 4,136,710 | 1/1979 | Bond | 251/172 X |
| 4,141,536 | 2/1979 | Graham | 251/161 |
| 4,215,722 | 8/1980 | Sigmon | 251/172 X |

*Primary Examiner*—Harold W. Weakley
*Attorney, Agent, or Firm*—Christie, Parker & Hale

[57] ABSTRACT

A rotary plug valve has hydraulically actuated seals for sealing between a valve body and a rotatable valve plug. The valve plug is rotated to open or close the valve. A valve handle for turning the plug can be rotatably uncoupled from the valve plug when the valve is closed and turned relative to the plug toward an overtravel position to actuate a hydraulic piston to pressurize the seals. A second piston regulates pressure to the seals and prevents overpressurization.

8 Claims, 11 Drawing Figures

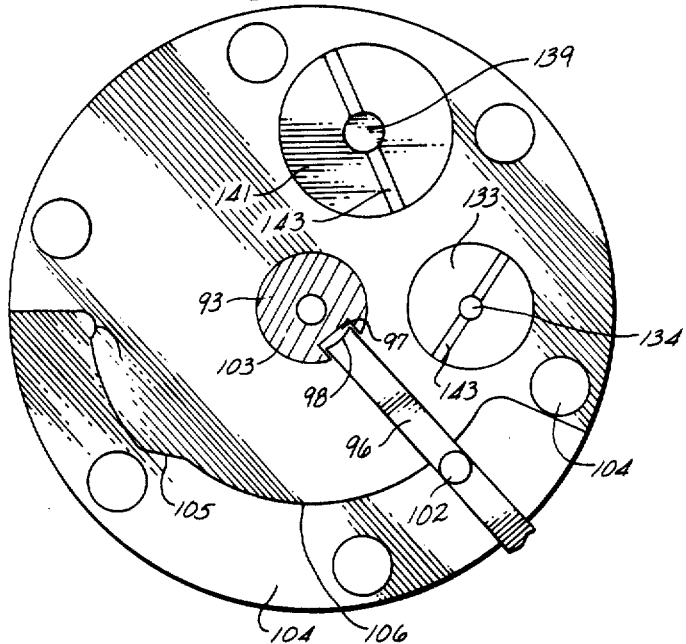
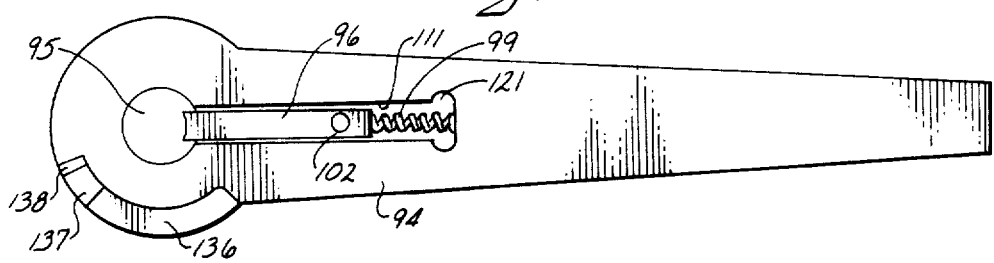
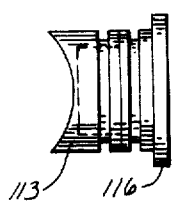 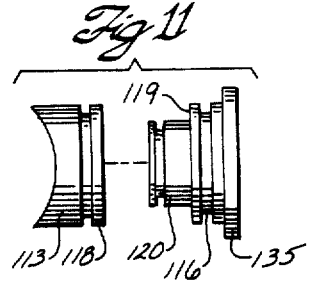

PLUG VALVE WITH HYDRAULICALLY ACTUATED SEALS

FIELD OF THE INVENTION

This invention relates to valves for controlling the flow of fluid through a line, and more particularly to valves of the plug type in which inlet and outlet ducts in the valve body are brought into fluid communication through a port formed in the valve plug by rotating the valve plug within the body. Still more particularly, this invention provides a plug valve having a hydraulically actuated seal between the plug and the valve body. The handle for turning the plug can be uncoupled from the plug and turned further to an overtravel position for actuating the hydraulic seal.

BACKGROUND OF THE INVENTION

Fluid valves of the rotary plug type are well known. The principal problem posed by such valves is the need to maintain a fluid seal between the rotating valve plug and the inlet and outlet ducts in the casing wall.

Failure to effectively seal these ducts, especially the inlet duct, not only prevents the valve from controlling the flow of fluid through the line, but frequently leads to erosion. If not remedied, eventual destruction of the plug, scouring of the inner wall of the casing, damage to the plug bearing, and fluid leakage are common.

The ability of a rotary plug valve to effectively seal its ducts is particularly important when the operating fluid is abrasive, chemically reactive, or extremely hot or cold.

U.S. Pat. No. 4,130,129 to Jack H. Pollack dicloses a rotary plug valve having a hydraulically augmented seal. A pair of sealing plugs are provided in the valve body to effectively seal the inlet and outlet ducts of the valve when under hydraulic pressure. However, the sealing plugs in the reference are under constant hydraulic pressure regardless of whether the valve is in an open or closed position. The constant pressure on the sealing plugs makes the valve difficult to open from a closed position and accelerates damage to the valve.

There is need for a rotary plug valve which effectively seals the inlet and outlet ducts but which does not have the disadvantages of the aforementioned U.S. Patent.

SUMMARY OF THE INVENTION

The rotary plug valve of this invention comprises a valve body having an inlet duct and an outlet duct, and a rotatable valve plug having a port for fluid communication between the ducts. The valve has an opened position where at least part of the port overlaps the ducts, and a closed position where no part of the port overlaps the ducts. Hydraulically actuated seal means are provided for selectively sealing between the plug and the valve body around the ducts in the closed position. A handle turns the valve plug from the opened position to the closed position and vice versa.

A hydraulic fluid communicates between a reservoir and the hydraulically actuated seal means. A piston operatively communicates with the reservoir for applying pressure to the hydraulic fluid to pressurize the seal.

Means are provided for rotatably coupling and uncoupling the handle with or from the valve plug. When the valve is opened, the handle is coupled with the valve plug. When the valve is closed, the handle is uncoupleable from the valve plug and can, while uncoupled, be rotated further toward an overtravel position. An actuating means is provided for actuating the piston by the handle between the start of the uncoupled rotation and the overtravel position for pressurizing the seal means.

DESCRIPTION OF THE DRAWINGS

These and other features and advantages of the present invention will be better understood by reference to the following detailed description when considered with the accompanying drawings wherein:

FIG. 8 is a top plan view of a top plate for the valve of FIG. 7 taken along lines 8—8 of FIG. 7 (with the valve handle removed);

FIG. 9 is a bottom view of the underside of the handle for the valve of FIG. 7;

FIG. 10 is a side elevational view of a sealing ring for the valve of FIG. 7; and FIG. 11 is an exploded side elevational view of the sealing ring of FIG. 11.

DETAILED DESCRIPTION

Figure 1:
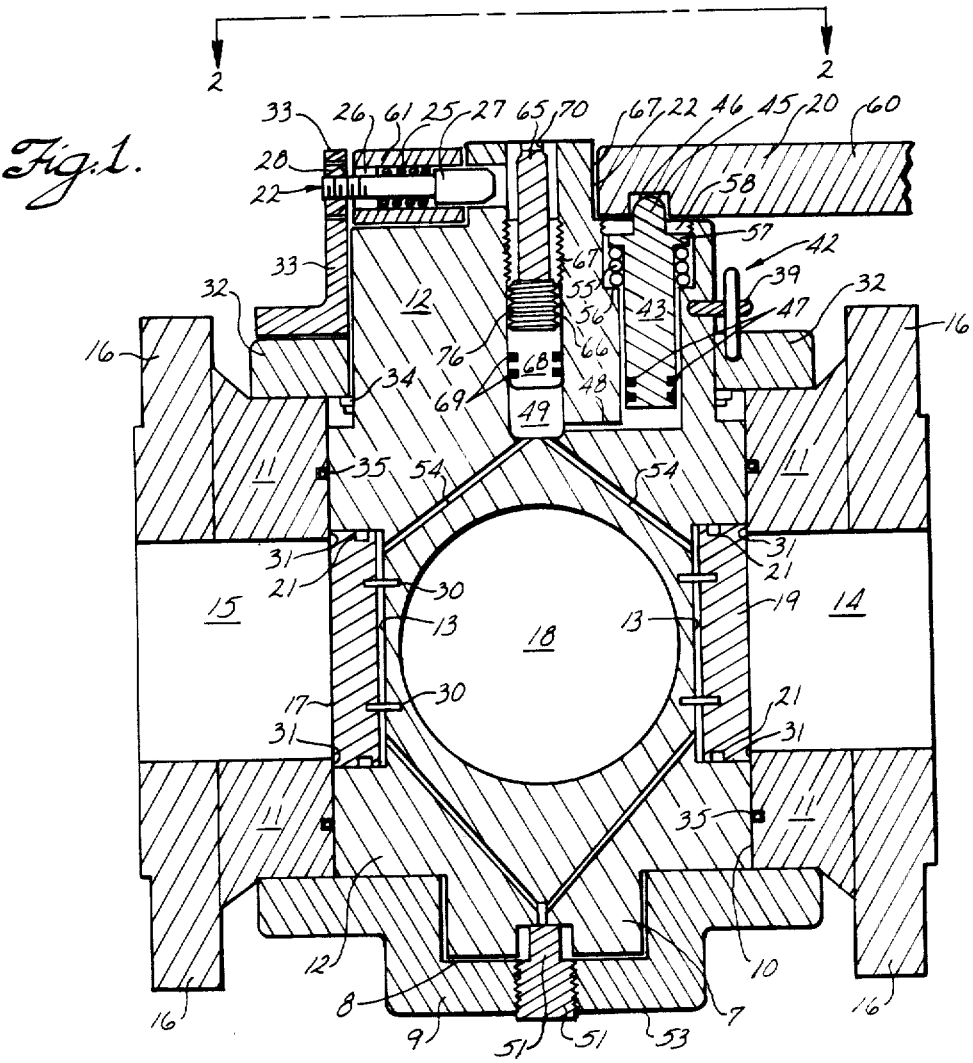
FIG. 1 is a cross-sectional view of a rotary plug valve according to this invention.
Figure 4:
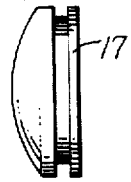
FIG. 4 is a top plan view of a typical sealing plug for the valve of FIG. 1.
Figure 5:
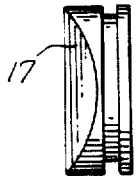
FIG. 5 is a side elevational view of the sealing plug of FIG. 4.

A rotary plug valve has a hollow valve body 11 with opposed inlet and outlet ducts 14 and 15. Both the inlet duct and the outlet duct are adapted to be installed on a conventional pipe and lead to a respective conventional flanged fitting 16. The valve body is also provided with a cylindrical plug cavity 10 with its axis normal to the axis of the ducts 14 and 15. A valve bottom cap 9 is provided at the bottom of the valve body. The bottom cap includes a cylindrical recess 8 coaxial with the plug cavity.

A cylindrical valve plug 12 fits closely within the plug cavity 10. A bearing boss 7 fits into the cylindrical recess 8 and serves as a bearing to permit rotation. If desired a sealing ring (not shown) can be provided around the boss 7 and a biasing spring (not shown) can fit into the recess 8 below the boss. A bearing pedestal 6 is found on the opposite or outer end of the valve plug. The bearing pedestal is supported for rotation in a valve top cap 32 which is bolted to the valve body. The valve top cap also retains the plug in place in the valve body.

The valve plug includes a longitudinal port 18 transverse to its axis of rotation. When the port overlaps the inlet and outlet ducts, the valve is in an opened position and fluid can communicate between the ducts. When the port is turned 90° out of alignment with the inlet and outlet ducts, the valve is in a closed position and flow of fluid between the ducts is blocked by two sealing plugs 17 and 19.

The sealing plugs are received in two generally cylindrical recesses 13 in the valve plug. The recesses are 90° out of alignment with the port 18. The recesses are diametrically opposed so they can be aligned with the inlet and outlet ducts 14 and 15 when the valve is in the closed position. The diameter of either recess is greater than that of the ducts.

The sealing plugs 17 and 19 are sized to fit snugly in the recesses. Preferably, the sealing plugs are fabricated from a hardened alloy having a low coefficient of thermal expansion and are faced with tungsten carbide or other material having a high resistance to the temperature and abrasive character of the fluid passing through the pipeline.

An O-ring 21 on each sealing plug maintains a fluid tight seal between the sealing plug and the inner surfaces of the recess. When the hydraulic system is actuated, this seal enables the sealing plug to project hydraulic pressure against the inner wall 31 of the valve body and the duct to seal the valve.

To prevent the plugs 17 and 19 from rotating in the recesses 13 while allowing the plugs to move freely outwardly against the valve body or inwardly against the valve plug, a plurality of locating pins 30 are seated in the wall of the valve plug and extend into the recesses. The pins are received in corresponding pin holes in the backs of the sealing plugs. In the presently preferred embodiment, the sealing plugs move radially outwardly about 10 to 11 thousandths of an inch when the seal is pressurized.

A plurality of O-rings 35 around the valve plug seal the plug to the valve body. If desired, roller bearings or the like (not shown) can be used in larger valves to assure smooth rotation of the valve plug in the valve body.

A handle 20 is provided for turning the valve plug between the open and closed positions and for actuating the hydraulic system to pressurize the seals inside the valve. The handle includes an arm 60 which is secured to an annular cap portion 61 which seats around the top of the valve plug. Preferably the arm and cap portions are a one-piece construction. The handle is secured to the valve plug by three holddown fasteners 40. To allow for relative rotational movement between the handle and the valve plug, each holddown fastener is received in a corresponding slot 41 in the cap portion 61 of the handle.

Figure 2:
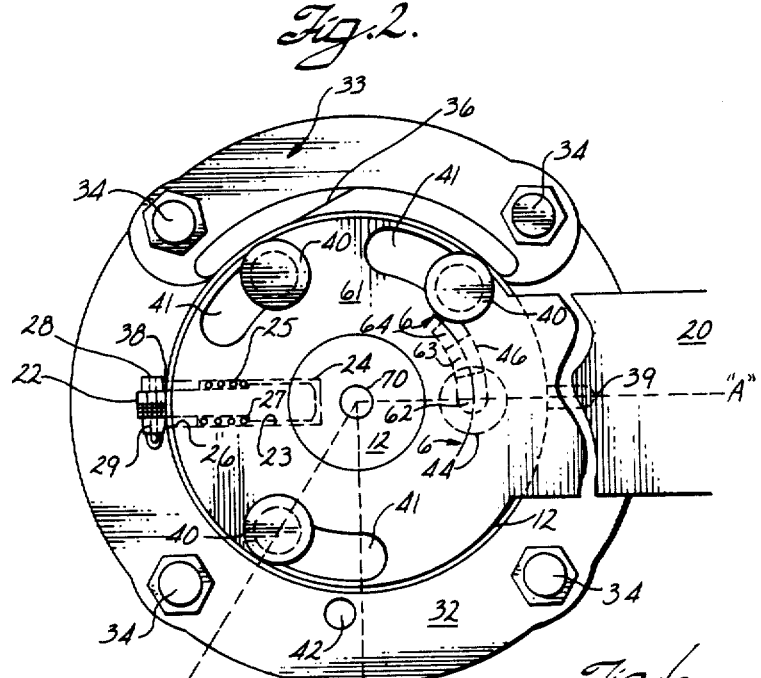
FIG. 2 is a top plan view of the valve taken along lines 2—2 of FIG. 1.
Figure 6:
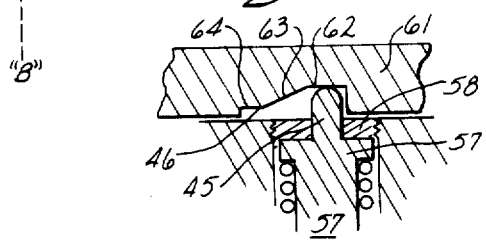
FIG. 6 is a side elevational view of a camming surface for the valve taken along lines 6—6 of FIG. 2.
Figure 3:
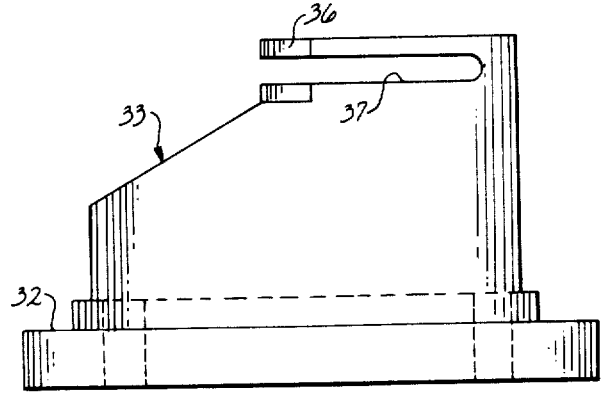
FIG. 3 is a side view of a pin unlocking cuff for the valve taken along lines 3—3 of FIG. 2.

The handle is rotatably coupled to the valve plug by means of a spring loaded locking pin 22. As seen in FIG. 2, the locking pin fits in a bore 23 in the handle cap and extends into a recess 24 in the valve plug 12. A spring 25 in the bore is seated against a fixed retainer 26 and a shoulder 27 on the locking pin. The spring resiliently urges the locking pin inwardly toward the valve plug. The retainer 26 is fixed in place by threading it into the outer end of the bore 23. Outside the handle cap a nut 28 is locked on the stem of the locking pin by a cotter pin 29.

In FIG. 2, the valve handle is shown in a position "A" corresponding to a fully open position of the plug valve, where the port 18 is aligned with the inlet and outlet ducts. Movement of the handle 90° in the clockwise direction in FIG. 2 to position "B" causes the port to move 90° out of alignment with the inlet and outlet ducts, corresponding to the closed position of the valve. In FIG. 1, the handle is depicted in the fully closed position "B" with the sealing plugs aligned with the inlet and outlet ducts.

To augment the ability of the valve to seal against fluid leakage in the closed position, the valve is provided with a hydraulically actuated sealing mechanism which becomes operative only when the valve reaches the fully closed position.

There is an annular top cap 32 secured to the top of the valve body by means of threaded fasteners 34 or the like. The top cap fits around the valve plug. A curved pin unlocking cuff 33 is secured to the top cap. The pin unlocking cuff includes a cam 36 at the open end of a slot 37 for engaging the nut 28 of the locking pin. As the handle is moved from position "A" to position "B", the cam slides under a beveled edge 38 of the locking pin nut and causes the locking pin to retract from the recess 24 away from the valve plug. The locking pin nut functions as a cam follower during this operation. Such retraction uncouples or disengages the handle from the valve plug so that the handle may rotate further in the clockwise direction shown in FIG. 2, from position "B" to an overtravel position "C", while leaving the port of the valve plug aligned 90° out of alignment with the inlet and outlet ducts. To allow for relative movement between the handle and the valve plug, the length of the slots 41 corresponds to the angular travel between positions "B" and "C", which preferably is on the order of 10°.

To prevent further rotation of the plug in the clockwise direction when the handle is uncoupled, a stop pin 39 is provided on the outside of the valve plug. In position "B" the stop pin contacts a stationary stop post 42 projecting upwardly from the valve body top cap 32.

During uncoupled rotation of the handle from position "B" to overtravel position "C", the handle actuates a hydraulic pressurization system to pressurize the seal in the valve. An actuator piston 43 is disposed in a cylinder 44 in the valve plug. The cylinder opens to the handle cap portion 61. The end of the piston facing the handle cap includes an outwardly extending cam follower tab pin 45 which engages a camming surface 46 defined on the underside of the handle cap. A pair of O-rings 47 at the lower end of the piston minimizes fluid loss from the cylinder 44 past the piston. The piston is resiliently biased upwardly toward the handle by a coil spring 55 set against a shoulder 56 of the cylinder and an annular flange 57 of the piston. An annular retainer 58 threaded into the upper end of the cylinder holds the piston assembly in the cylinder.

The lower end of the cylinder communicates with a hydraulic reservoir 49 through a passageway 48. The reservoir in turn communicates through two passageways 54 with the recesses 13 behind the sealing plugs 17 and 19. The hydraulic system also communicates with a bleed duct 51 at the lower end of the valve plug. The bleed duct is capped by a stopper 52 threaded into the valve body bottom cap 9. The bleed duct permits complete filling of the hydraulic system with liquid.

The camming surface 46 on the underside of the handle cap has a ramped configuration for urging the follower tab 45 and the actuator piston downwardly when the valve is in a closed position, and when the handle is rotated from position "B" to the overtravel position "C" to actuate hydraulic pressurization of the seals. The camming surface 46 defines an arcuate track on the underside of the handle which is concentric with the center of rotation of the handle. The surface extends angularly around the handle for the same angular extent as the range of uncoupled operation. Preferably the angular extent of the surface is about 10°.

The camming surface 46 has a raised portion 62, a ramped portion 63, and a lowered portion 64. The piston tab is exposed to the entire length of the ramped surface during uncoupled operation of the handle between positions "B" and "C". The tab on the piston is in effect a cam follower and engages the raised portion 62 when the handle is locked to the valve plug, between positions "A" and "B". When the handle is uncoupled from the plug and rotated toward overtravel position "C", the ramped portion 63 engages the piston tab and deflects it downwardly to begin pressurizing the seals. Preferably the incline of the ramped portion is about 20°. The lowered portion 64 engages the piston in position "C" to complete the pressurization.

The raised portion 62 of the camming surface 46 is recessed upwardly sufficiently from the lowered portion 64 (for example, about 3/16") so that when the valve is not fully closed, any hydraulic pressure which at that time might be applied to the sealing plugs is not sufficient to urge the sealing plugs outwardly against the casing wall of the valve body. Thus, the hydraulic system is not ordinarily actuated until the valve is in a fully closed position "B" and the handle is uncoupled from the valve plug.

When the handle is rotated from position "A" and reaches position "B", the cam 36 on the unlocking cuff 33 engages the nut 28 of the locking pin 22 to cause the pin to retract from the valve plug and disengage the handle from the plug. Further rotation of the handle toward position "C" causes the piston tab to leave the raised portion 62 and traverse the ramped portion 63 on the handle cap. The downwardly inclined ramped portion 63 urges the piston 43 downwardly into the cylinder. The downward motion of the actuator piston causes an increase in hydraulic pressure in the reservoir 49 which is applied through the passageways 54 to the sealing plugs 17 and 19. For example, the actuator piston can be forced downwardly about 3/16", which is the vertical difference in height between the raised and the lowered portions 62 and 64 of the camming surface 46.

Turning the uncoupled handle all the way to position "C" causes the piston tab to engage the lowermost portion 64 of the camming surface. The piston is forced to its greatest downward extent into the cylinder, maximizing the hydraulic pressure in the reservoir. In response, the sealing plugs 17 and 19 move radially outwardly against the inner wall 31 of the valve body and seal off the inlet and outlet ducts.

Conversely, when it is desired to open the valve, the handle is rotated from position "C" to position "B" and the actuator piston 43, urged by the spring 55, moves upwardly to follow the configuration of the ramped portion 63 of the camming surface 46 on the underside of the handle. The hydraulic pressure in the reservoir is reduced. This depressurizes the hydraulic system and the sealing plugs are no longer urged radially outwardly by the hydraulic system. The spring 55 is stiff enough that a vacuum effect occurs in hydraulic pressure, causing the sealing plugs to return fully into their recesses 13 against the inner wall of the valve plug. In position "B", the cam 36 releases the nut 28 of the locking pin and the spring 25 urges the locking pin to return into the recess 24 in the valve plug, once again coupling the handle to the valve plug. To facilitate registry of the locking pin in the valve plug, the head of the locking pin is preferably beveled or tapered.

In the presently preferred embodiment, the rotary plug valve is provided with a pressure regulator and indicator piston 65 which is seated in the hydraulic reservoir 49. Preferably the reservoir is concentric with the center of rotation of the valve plug so that an upper edge 70 of the regulator piston can project upwardly through the central area left open by the annular handle cap 61.

The pressure regulator piston is resiliently urged downwardly against hydraulic pressure present in the reservoir by a spring 66 which is seated against a threaded bushing 67 and a shoulder 68 on the regulator piston. A pair of O-rings 69 minimize loss of fluid past the piston. Preferably the spring 66 comprises a stack of Belleville springs which facilitates adjusting the restoring force acting on the regulator piston within small tolerances.

When the handle urges the actuator piston 43 downwardly to pressurize the hydraulic system, the increase in pressure in the hydraulic reservoir 49 urges the regulator piston 65 upwardly against the restoring force of the Belleville springs. The volume occupied by the stroke of the regulator piston 65 is less than the volume occupied by the stroke of the pressure piston 43. Accordingly, when the handle 20 rotates from position "C" back to position "B" to cause the actuator piston 45 to move upwardly, the pressure in the hydraulic system is actively released despite the fact that the regulator piston 65 will return to its original position due to the restoring force of the Belleville springs. Since the pressure in the hydraulic reservoir is reduced, a relative vacuum is experienced by the sealing plugs 17 and 19, which withdraws the seal. Upon further rotation of the handle toward position "A", engagement of the locking pin in the valve plug couples the handle to the plug which permits the valve to be opened. When the valve is closed, the top of the regulator piston 65 pops above the top surface of the valve plug 12, giving a visual indication that the valve is pressurized. If for some reason the hydraulic pressure were to become lost, the top of the indicator piston 65 would drop back into the valve plug, indicating the loss of pressure and the need for maintenance or repair.

The regulator piston provides in effect a variable volume hydraulic system. The handle with its camming ramp 46 has a fixed effect on the actuator piston. Without the regulator piston it would be possible to damage the seals by overpressurization if the operating pressure was inadvertently set too high. The regulator piston can accommodate any "over" pressure and prolongs the useful life of the valve by providing resiliency to the hydraulic system, in effect providing a variable volume reservoir.

The pressure at which the sealing plugs 17 and 19 operate can be controlled by adjusting the Belleville springs 66. These may be readily adjusted by providing spanner wrench notches at the upper surface of the threaded bushing 67. Turning the threaded bushing causes it to move vertically which adjusts the restoring force of the Belleville springs. This in turn adjusts the operating pressure applied to the sealing plugs. Any pressure applied to the reservoir above the setting of the Belleville springs is absorbed by upward motion of the regulator piston. The springs limit operating pressure and prevent overloading the sealing plugs.

In an exemplary embodiment the valve is supplied with twenty Belleville springs. The regulator piston 65 can be calibrated by placing notches along its side near its upper edge 70 where the vertical position of the piston, corresponding to the hydraulic pressure then present in the reservoir, can be visually inspected.

A rotary plug valve constructed according to this invention has several advantages over conventional plug valves. The new valve is designed to minimize or eliminate stress in several key areas. By pressurizing the hydraulic system only when the valve is closed, the valve is easy to open or close and damage to the sealing plugs is avoided. By providing a ramped surface on the handle cap establishing a fixed downward stroke for the actuating piston, and by providing through a separate regulator piston, the pressure at which the plugs seal may be precisely adjusted or calibrated. By providing a resilient regulator piston, damage to the valve by inadvertent overpressurizing of the seals is avoided. By resiliently urging the actuating piston against the camming surface on the handle, the sealing plugs pop back into their their recesses when the hydraulic system is depressurized, making the valve easy to open and close.

Figure 7:
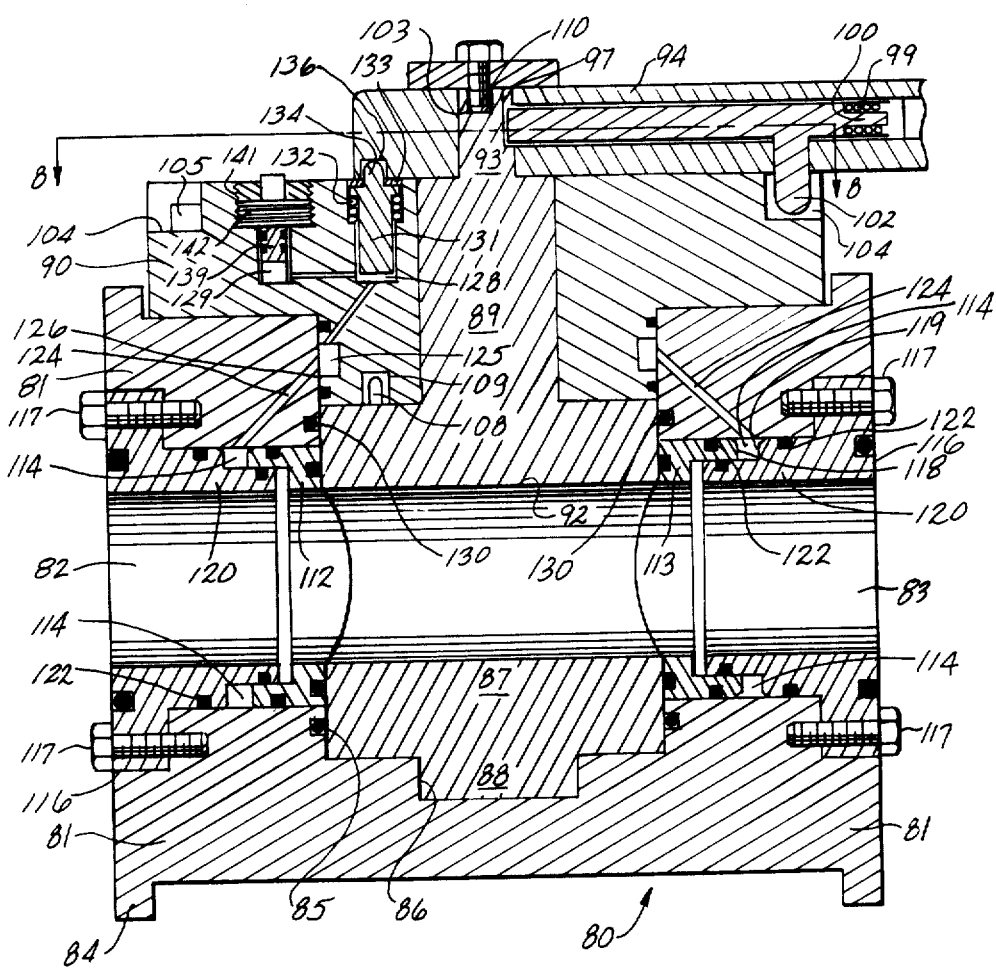
FIG. 7 is a cross-sectional view of the upper portion of an alternate embodiment of the rotary plug.

Another preferred embodiment of the invention is a plug valve 80 illustrated in FIG. 7. The valve has a hollow valve body 81 with opposed inlet and outlet ports 82 and 83. A flange 84 is provided at each end of the valve body for bolting the valve into a fluid carrying line. A cylindrical plug cavity 85 is provided in the valve body with its axis normal to the axis of the ports 82 and 83. There is a cylindrical recess 86 at the bottom of the valve body coaxial with the plug cavity. A cylindrical valve plug 87 fits closely within the plug cavity 85. A bearing boss 88 fits into the cylindrical recess 86 in the valve body and serves as a bearing for the plug to permit rotation. A bearing pedestal 89 is formed on the opposite or outer end of the valve plug. The bearing pedestal is supported for rotation in a valve top plate 90 which is bolted to the valve body. The valve top plate also retains the plug in place in the valve body.

A fluid flow passage 92 extends through the valve plug transverse to its axis of rotation. When the fluid flow passage 92 is aligned with the inlet and outlet ports 82 and 83, as per FIG. 7, the valve is open for flow. When the plug is rotated one quarter turn or 90° the fluid flow passage is not aligned with the ports and the valve is closed.

A cylindrical boss 93 on the bearing pedestal is received through a circular orifice 95 in a handle 94. The handle is long enough to permit ready opening or closing of the valve by hand at its operating pressure.

The handle receives a locking pin 96 to rotatably couple the handle with the valve plug. The handle is coupled to the plug by engaging the inner end of the locking pin with a rectangular-shaped notch or "keyway" 97 in the cylindrical boss 93. The locking pin is seated in a groove 111 on the underside of the handle. The groove preferably runs parallel to the long axis of the handle and constrains the locking pin to motion along that axis. The locking pin has an arcuate inner edge 98. The locking pin is spring loaded by a spring 99 centered in a shallow hole in the end of the locking pin. The spring resiliently urges the inner edge of the locking pin into contacting the boss 93. The inner edge of the locking pin is seated inside the rectangular notch 97 when the handle is rotatably coupled to the plug.

To rotatably uncouple the handle from the plug, the locking pin is withdrawn from the notch 97. The locking pin includes a downwardly projecting cam follower tab 102 which engages a camming track 104 defined in the valve top plate 90. The camming track is a recessed surface which extends partially around the circumference of the upper face of the valve top plate. The camming track includes an inner face 106 and a retractor 105. The inner face is at one radial distance from the center of rotation of the handle. This distance corresponds to the lateral separation between the tab 102 and the inner end of the locking pin. The retractor slopes radially outwardly from the inner face and is angularly positioned on the track 104 to correspond to the angular travel of the handle between the closed and overtravel positions.

When the handle is rotatably coupled to the plug, the locking pin is seated inside the notch 97 since the tab 102 is urged against the radially inner face 106 of the camming track. Rotation of the handle toward the closed position causes the tab to negotiate the retractor 105 which withdraws the arcuate inner edge 98 of the locking pin from the notch 97 in the cylindrical boss 93 uncoupling the handle from the valve plug. The handle may then be rotated further to an overtravel position to actuate the hydraulic system in the valve. The inner edge 98 of the locking pin has an arcuate shape so that it will slide readily around the cylindrical boss when the handle is uncoupled from the valve plug.

To prevent rotation of the valve plug when the handle is uncoupled from the plug, an upwardly extending pin 108 is provided on the plug which interfaces with a circumferentially directed groove 109 in the valve top plate 90. The groove 109 extends for a quarter turn around the valve so that the plug can be rotated 90° between the open and closed positions.

When the handle is rotated back from the overtravel position, the locking pin, which runs along the longitudinal axis of the handle, becomes aligned with the notch 97 in the boss 93. At the same instant, the tab 102 moves radially inwardly as it negotiates the retractor 105. The restoring force of the spring 99 causes the inner edge 98 of the locking pin to register with the notch 97 in the boss 93. The handle is once again rotatably coupled to the valve plug 87, and the valve can be turned toward the fully open position if desired.

The valve 80 is provided with a hydraulic system to pressurize seals around the valve plug. This valve differs from the valve of FIGS. 1-6 in that sealing plugs are provided in the valve body rather than in the valve plug. A pair of ring like sealing plugs 112 and 113 are provided in the inlet and outlet ports 82 and 83. A ring-like seal backing plug 116 is fitted into each of the ports 82 and 83. Each backing plug is held in place in the port by a plurality of bolts 117. The backing plugs include an inwardly directed annular sleeve 120 and a flat forward face 119. Each of the sealing plugs has a flat back face 118 that corresponds to the flat face 119 of the backing plug. The inner face of the sealing plug is arcuate and conforms closely to the cylindrical side of the valve plug 87. The sealing plugs can slide radially inwardly or outwardly on the annular sleeves 120. A pair of O-rings 122 seal the edges of the backing plug and the sealing plug with the port wall. Hydraulic pressure applied in the space or seal groove 114 pressurizes the volume between the faces 118 and 119. This pushes the sealing plug tightly against the valve plug 87.

Each seal groove 114 communicates through a diagonal passage 124 in the valve body to an annular reservoir 125 in the valve top plate 90. The valve top plate extends into the valve cavity below the upper face of the valve body. The reservoir 125 is located in the region where the top plate extends into the valve cavity. The reservoir runs circumferentially around the valve top plate. A plurality of O-rings 126 seal against fluid leakage between the valve top plate and the valve body.

while a plurality of O-rings seal between the valve plug and the valve body.

The reservoir is in communication via a passage 127 with an actuator cylinder 128 and a regulator cylinder 129. It should be understood that the presently preferred true positions of the actuator cylinder 128, the regulator cylinder 129, the boss 93, the camming track 104, and the retractor cam 105 relative to each other is depicted in FIG. 8. The positioning of the cylinders in FIG. 7 is somewhat different for ease of displaying all components in one cross sectional view.

The actuator cylinder opens to the upper face of the valve cover and contains an actuator piston 131. The piston is held in place by a retainer 133. A cam follower tab 134 on the actuator piston extends above the upper surface of the valve cover and contacts an actuator ramp 136 on the underside of the handle 94. A spring 132 urges the piston upwardly to cause the tab 134 to contact the actuator ramp 136. The actuator ramp 136 includes a downwardly sloping cam 137 for depressing the actuator piston when the handle is rotatably uncoupled from the valve plug and extended into its overtravel position. A flat portion 138 of the cam depresses the piston to its maximum extent. The operation of the actuator piston and actuator ramp is similar to the operation of the actuator piston 43 and the ramped surface 46 described previously in connection with the embodiment of the valve in FIGS. 1-6.

A regulator piston 139 is provided in the regulator cylinder 129 and is kept in the cylinder by a threaded retainer 141. A plurality of Belleville springs 142 resiliently urge the regulator piston downwardly against hydraulic pressure in the regulator cylinder. Spanner wrench notches 143 are provided at the upper surface of the retainers 133 and 141 for ease of assembly of the pistons in their cylinders.

When the handle is uncoupled from the valve plug and extended to its overtravel position, the tab 134 on the actuator piston 131 negotiates the cam 137 on the actuator ramp and is forced downwardly. The downward motion of the actuator piston causes an increase in hydraulic pressure in the reservoir 125 as fluid pressure is transmitted via the passage 127. The hydraulic pressure increase is transmitted by the diagonal passage 124 to the seal groove 114 which in turn causes the sealing plugs 112 and 113 to move radially inwardly to seal tightly against the valve plug 87.

Upon movement of the handle back from the overtravel position to the fully closed position, the tab and the actuator position move upwardly against the actuator ramp on the handle, which causes a decrease in hydraulic pressure in the reservoir and the seal grooves, which in turn causes retraction of the sealing plugs.

The operation of the regulator piston 139 is similar to the regulator piston 65 discussed previously. The regulator piston 139 prevents overpressurization of the valve seals by providing in effect a variable volume resilient valve reservoir. The restoring force of the Belleville springs can be adjusted by turning the notches 143 on the retainer 141 to limit the sealing pressure to desired operating pressures. The top of the regulator piston 139 pops above the upper surface of the valve top plate 90 when the valve is closed, giving visual confirmation of valve pressurization. If the valve is closed and the piston becomes depressed in the valve top plate, this indicates loss of pressure and the need for maintenance or repair.

The valve 80 is designed to reduce stress in key areas. In a presently preferred embodiment the valve 80 was tested and found capable of operation by hand turning the handle while carrying a pressure of 2500 psi in the line.

By providing sealing plugs in the valve body rather than in the valve plug, the valve can be made to seal in positions other than the fully closed position. For such applications the actuator ramp 136 can be modified to include more than one cam 137 to cause the actuator piston to depress in whatever position is desired. It is also possible to modify the camming track 104 to include a second uncoupling retractor that, for example, can be provided at the opposite end of the track from the present retractor 105 for providing uncoupled operation of the handle at the fully open position of the valve.

Another embodiment of valve is quite similar to the valve illustrated in FIGS. 7 to 11. In that embodiment the valve body 81 and top plate 90 are not separate but are integral. A bottom plate is provided at the opposite end of the plug and the plug is inserted into the valve body from the bottom instead of from the top. This effects a substantial saving in machining costs. The basic valve structure and operation is unchanged.

The description has been set forth in the context of the presently preferred embodiment of the invention from which other embodiments consistent with the spirit of the description may differ. It is not intended that the description serve as a catalog exhausting all forms which the invention can take. Workers skilled in the art will appreciate that variations in the structures and procedures described above may be practiced without departing from the spirit of the invention.

What is claimed is:

1. A rotary plug valve comprising:
a body having an inlet duct and an outlet duct;
a rotatable valve plug in the body having a port for fluid communication between the ducts, the valve having an open position where at least part of the port overlaps the ducts, and a closed position where no part of the port overlaps the ducts;
means mounted on the plug for forming a pressurizable seal with the body;
a fluid reservoir containing a hydraulic fluid and communicating with the pressurizable seal;
a piston in the valve plug operatively communicating with the reservoir for applying pressure to the hydraulic fluid in the reservoir for pressurizing the seal;
a handle for turning the valve plug from the open position to the closed position;
means for rotatably coupling and uncoupling the handle with or from the valve plug, the handle being coupled with the valve plug when the valve is open, the handle being uncoupled from the valve plug when the valve is closed, the coupling means including,
a cam on the valve body, a locking pin, a cam follower on the locking pin, a passage in the handle for receiving the locking pin, a recess in the valve plug for engaging the locking pin, and means for urging the cam follower against the cam, whereby engagement of the cam follower with the cam causes the locking pin to selectively engage or disengage the recess in the valve plug, so that when the locking pin engages the recess, the handle is rotatably coupled with the valve plug, and when the locking pin is withdrawn from the recess and disengages the recess, the handle is rotatably uncoupled from the valve plug, and actuating means for actuating the piston upon the rotation of the handle when the handle is rotatably uncoupled from the valve plug for pressurizing the seal.

2. A rotary plug valve comprising:

a body having an inlet duct and an outlet duct;

a rotatable valve plug in the body having a port for fluid communication between the ducts, the valve having an open position where at least part of the port overlaps the ducts, and a closed position where no part of the port overlaps the ducts;

means mounted on the plug for forming a pressurizable seal with the body;

a fluid reservoir containing a hydraulic fluid and communicating with the pressurizable seal;

a piston in the valve plug operatively communicating with the reservoir for applying pressure to the hydraulic fluid in the reservoir for pressurizing the seal;

a handle for turning the valve plug from the open position to the closed position;

means for rotatably coupling and uncoupling the handle with or from the valve plug, the handle being coupled with the valve plug when the valve is open, the handle being uncoupled from the valve plug when the valve is closed, the coupling means including a cam on the valve body, a locking pin, a cam follower on the locking pin, a passage in the handle for receiving the locking pin, a recess in the valve plug for engaging the locking pin, and means for urging the cam follower against the cam, whereby engagement of the cam follower with the cam causes the locking pin to selectively engage or disengage the recess in the valve plug, so that when the locking pin engages the recess, the handle is rotatably coupled with the valve plug, and when the locking pin is withdrawn from the recess and disengages the recess, the handle is rotatably uncoupled from the valve plug;

means for preventing further rotation of the valve plug relative to the valve body when the handle is uncoupled from the valve plug; and actuating means for actuating the piston upon the rotation of the handle when the handle is rotatably uncoupled from the valve plug for pressurizing this seal.

3. A rotary plug valve comprising:

a body having an inlet duct and an outlet duct;

a rotatable valve plug in the body having a port for fluid communication between the ducts, the valve having an open position where at least part of the port overlaps the ducts, and a closed position where no part of the port overlaps the ducts;

means mounted on the plug for forming a pressurizable seal with the body including a pair of sealing plugs received in the valve plug for registry around the inlet and outlet ducts when the valve is in its closed position;

a fluid reservoir containing a hydraulic fluid and communicating with the pressurizable seal;

a piston in the valve plug operatively communicating with the reservoir for applying pressure to the hydraulic fluid in the reservoir for pressurizing the seal;

a handle for turning the valve plug from the open position to the closed position;

means for rotatably coupling and uncoupling the handle with or from the valve plug, the handle being coupled with the valve plug when the valve is open, the handle being uncoupled from the valve plug when the valve is closed, the coupling means including a cam on the valve body, a locking pin, a cam follower on the locking pin, a passage in the handle for receiving the locking pin, a recess in the valve plug for engaging the locking pin, and means for urging the cam follower against the cam, whereby engagement of the cam follower with the cam causes the locking pin to selectively engage or disengage the recess in the valve plug, so that when the locking pin engages the recess, the handle is rotatably coupled with the valve plug, and when the locking pin is withdrawn from the recess and disengages the recess, the handle is rotatably uncoupled from the valve plug; and actuating means for actuating the piston upon the rotation of the handle when the handle is rotatably uncoupled from the valve plug for pressurizing this seal.

4. A quarter-turn plug valve comprising:

a valve body having an inlet duct and an outlet duct;

a valve plug mounted in the valve body for rotation between an open position and a closed position 90° from the open position;

hydraulic actuated seal means for selectively sealing between the valve plug and the valve body the hydraulically actuated seal means comprising a sealing plug corresponding to each one of the inlet and outlet ducts, each such sealing plug being disposed in the valve plug for selectively sealing between the valve body and the valve plug around the corresponding duct;

a handle for rotating the valve plug 90° between the open and closed position;

means for uncoupling the handle from the valve plug at the end of the 90° rotation of the plug for further rotation of the handle toward an overtravel position, said uncoupling means including a locking pin and a retractor on the valve body for selectively engaging the locking pin, the locking pin being constrained to the motion along the axis of the handle for selectively engaging or disengaging the plug, whereby engagement of the locking pin with the plug couples the handle with the plug, and whereby engagement of the locking pin by the retractor disengages the locking pin from the valve plug to uncouple the handle from the plug;

a hydraulic piston for actuating the seal means; and means for actuating the hydraulic piston by the handle between the end of the 90° rotation and the overtravel position for pressurizing the seal means.

5. A quarter-turn plug valve comprising:

a valve body; the valve body having an inlet duct and an outlet duct;

a valve plug mounted in the valve body for rotation between an open position and a closed position 90° from the open position;

hydraulic actuated seal means for selectively sealing between the valve plug and the valve body, the hydraulically actuated seal means comprising a sealing ring corresponding to each one of the inlet and outlet ducts, each sealing ring being disposed in the valve body for selectively sealing tightly against the valve plug;

a handle for rotating the valve plug 90° between the open and closed position;

means for uncoupling the handle from the valve plug at the end of the 90° rotation of the plug for further rotation of the handle toward an overtravel position, said uncoupling means including a locking pin and a retractor on the valve body for selectively engaging the locking pin, the locking pin being constrained to the motion along the axis of the handle for selectively engaging or disengaging the plug, whereby engagement of the locking pin with the plug couples the handle with the plug, and whereby engagement of the locking pin by the retractor disengages the locking pin from the valve plug to uncouple the handle from the plug;

a hydraulic piston for actuating the seal means; and means for actuating the hydraulic piston by the handle between the end of the 90° rotation and the overtravel position for pressurizing the seal means.

6. A quarter-turn plug valve comprising:

a valve body;

a valve plug mounted in the valve body for rotation between an open position and a closed position 90° from the open position;

hydraulic actuated seal means for selectively sealing between the valve plug and the valve body;

a handle for rotating the valve plug 90° between the open and closed position;

means for uncoupling the handle from the valve plug at the end of the 90° rotation of the plug for further rotation of the handle toward an overtravel position, said uncoupling means including a locking pin and a retractor on the valve body for selectively engaging the locking pin, the locking pin being constrained to the motion along the axis of the handle for selectively engaging or disengaging the plug, whereby engagement of the locking pin with the plug couples the handle with the plug, and whereby engagement of the locking pin by the retractor disengages the locking pin from the valve plug to uncouple the handle from the plug;

a hydraulic piston for actuating the seal means; and means for actuating the hydraulic piston by the handle between the end of the 90° rotation and the overtravel position for pressurizing the seal means, the actuating means including a camming surface on the handle, a cam follower on the piston, and means for urging the cam follower against the cam to selectively depress the piston by rotation of the handle.

7. A quarter-turn plug valve comprising:

a valve body;

a valve plug mounted in the valve body for rotation between an open position and a closed position 90° from the open position;

hydraulic actuated seal means for selectively sealing between the valve plug and the valve body;

a handle for rotating the valve plug 90° between the open and closed position;

means for uncoupling the handle from the valve plug at the end of the 90° rotation of the plug for further rotation of the handle toward an overtravel position, said uncoupling means including a locking pin and a retractor on the valve body for selectively engaging the locking pin, the locking pin being constrained to the motion along the axis of the handle for selectively engaging or disengaging the plug, whereby engagement of the locking pin with the plug couples the handle with the plug, and whereby engagement of the locking pin by the retractor disengages the locking pin from the valve plug to uncouple the handle from the plug;

a hydraulic piston for actuating the seal means; and means for actuating the hydraulic piston by the handle between the end of the 90° rotation and the overtravel position for pressurizing the seal means.

8. A quarter-turn plug valve comprising:

a valve body;

a valve plug mounted in the valve body for rotation between an open position and a closed position 90° from the open position;

hydraulic actuated seal means for selectively sealing between the valve plug and the valve body;

a handle for rotating the valve plug 90° between the open and closed position;

means for uncoupling the handle from the valve plug at the end of the 90° rotation of the plug for further rotation of the handle toward an overtravel position, said uncoupling means including a locking pin and a retractor on the valve body for selectively engaging the locking pin, the locking pin being constrained to the motion along the axis of the handle for selectively engaging or disengaging the plug, whereby engagement of the locking pin with the plug couples the handle with the plug, and wherby engagement of the locking pin by the retractor disengages the locking pin from the valve plug to uncouple the handle from the plug;

a hydraulic piston for actuating the seal means;

an internal hydraulic volume in communication with the hydraulic piston and the seal means, and means for adjusting said hydraulic volume;

means for actuating the hydraulic piston by the handle between the end of the 90° rotation and the overtravel position for pressurizing the seal means.

* * * * *